United States Patent
Granberg

[15] 3,683,694
[45] Aug. 15, 1972

[54] POSITIVE DISPLACEMENT FLUID TRANSLATING DEVICE

[72] Inventor: Albert J. Granberg, 6178 Estates Dr., Oakland, Calif. 94611

[22] Filed: Sept. 14, 1970

[21] Appl. No.: 71,739

[52] U.S. Cl. ................................. 73/259, 418/29
[51] Int. Cl. ........................................ G01f 3/08
[58] Field of Search .................... 73/259; 418/29

[56] References Cited

UNITED STATES PATENTS

| 2,969,021 | 1/1961 | Menon | 418/29 X |
| 3,269,182 | 8/1966 | Granberg | 73/259 |
| 3,212,331 | 10/1965 | Granberg | 73/259 |
| 2,827,857 | 3/1958 | Eserkaln | 418/29 X |

FOREIGN PATENTS OR APPLICATIONS

| 587,807 | 1/1959 | Italy | 418/29 |

*Primary Examiner*—Richard C. Quiesser
*Assistant Examiner*—Arthur E. Korkosz
*Attorney*—Fryer, Tjensvold, Feix, Phillips & Lempio

[57] ABSTRACT

An improved fluid translating device with a recording counter employs a cylindrical rotor valve rotatably mounted in a meter case which has a plurality of ports in its periphery which cooperate with lands inside the meter case to form valves between the inlet and outlet, and a vaned rotor eccentrically mounted within the rotor valve which is attached to turn with the rotor valve but about its own axis of rotation so it forms a plurality of closed compartments between the several ports in the periphery of the rotor valve which change in volume as the rotor valve and vaned rotor turn within the meter case to deliver an arcuate, measured volume of fluid from the meter inlet to its outlet. The shaft mounting the vaned rotor eccentrically within the rotor valve and housing can be rotated to change the amount of relative eccentrically and thus the volumetric displacement of the several positive displacement compartments whereby the volume of fluid passing through the meter for each revolution of the rotor valve can be precisely adjusted thereby eliminating the necessity of applying a meter correction error reading.

15 Claims, 5 Drawing Figures

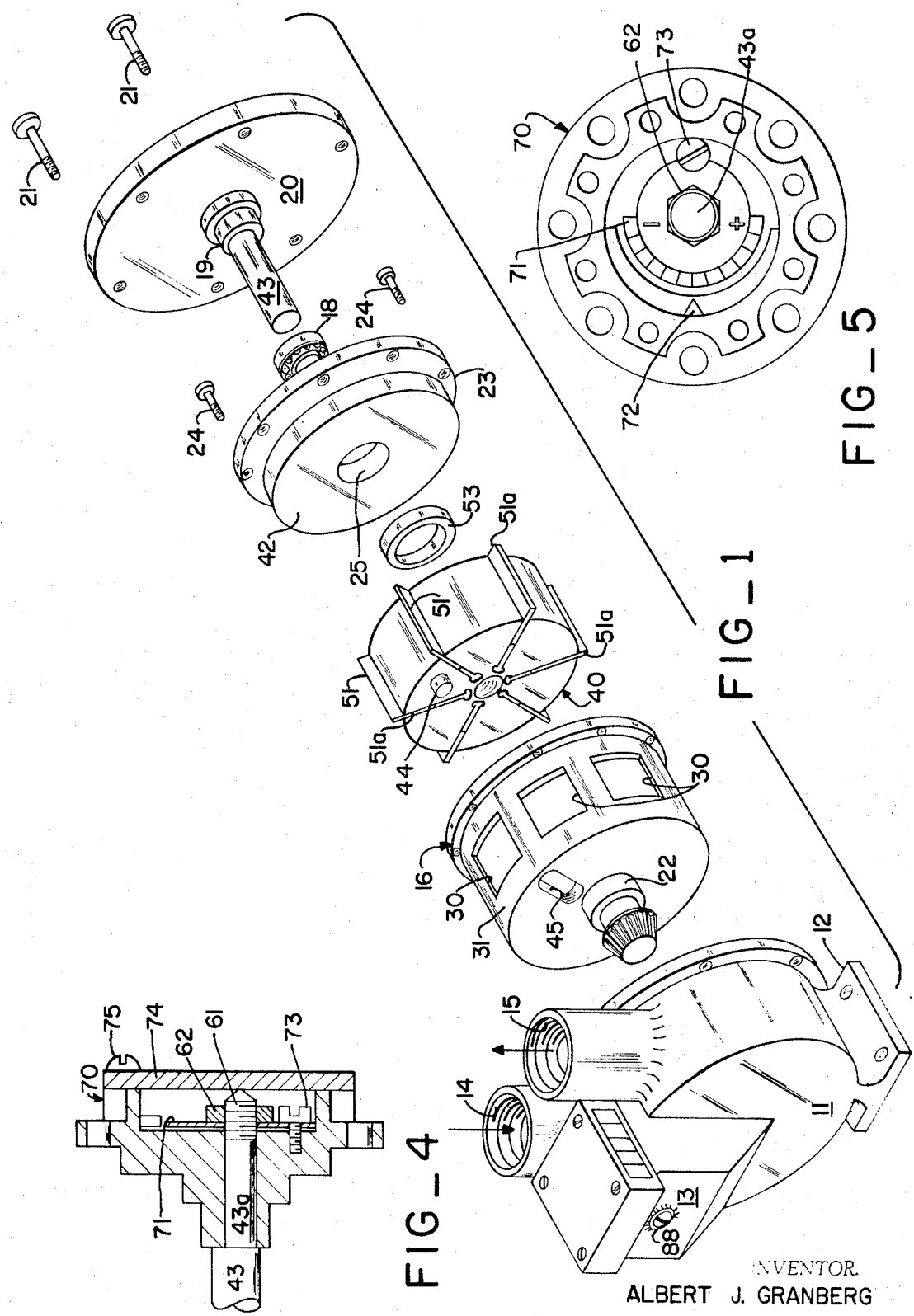

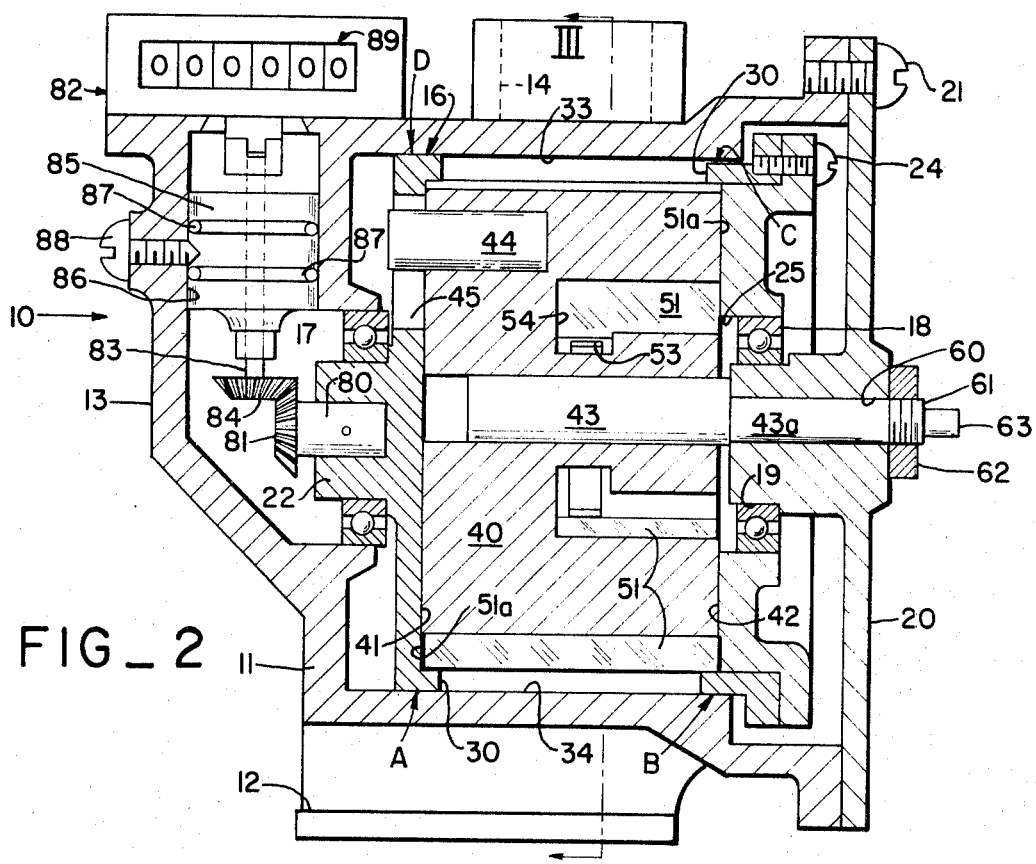
FIG_2
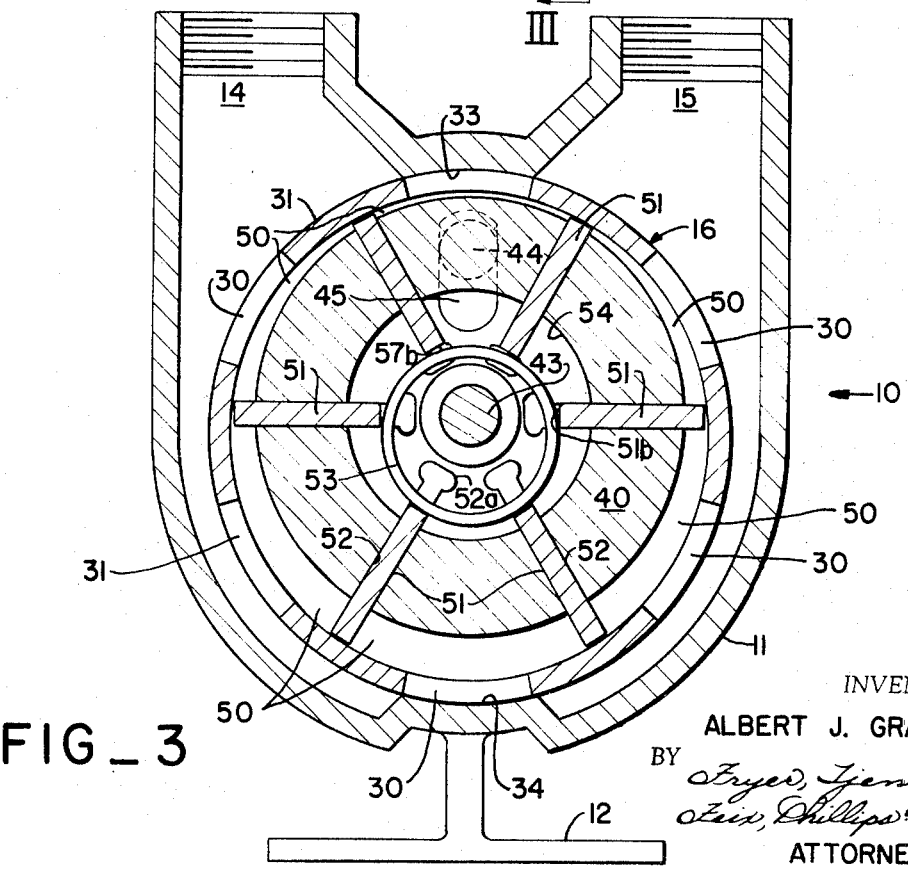
FIG_3
INVENTOR.
ALBERT J. GRANBERG
BY Fryer, Tjensvold,
Feix, Phillips & Lempio
ATTORNEYS

POSITIVE DISPLACEMENT FLUID TRANSLATING DEVICE

BACKGROUND OF THE INVENTION

Today's requirements in industry, particularly the chemical industries, often demand a measurement of liquids within precise volumetric amounts. Not only is precision accuracy required in such meters, but often they are required to have capacity ranges which vary from less than a small portion of 1 to over 600 gallons per minute without significant changes in accuracy over their full capacity range.

To achieve a high degree of volumetric accuracy in such meters, positive displacement type meters are commonly employed wherein a given volume of fluid is transferred from the meter inlet to its outlet as one or more of its compartments change from communication with the inlet of the meter to its outlet. The transfer of a measured volumetric amount of fluid from the meter inlet to its outlet is accomplished by having the compartment or compartments increase in volume when in communication with the meter inlet and decrease in volume by a like amount when in communication with the outlet of the meter thereby transferring a precise volume of liquid from the inlet to the outlet of the meter.

Examples of prior art meters of the positive displacement types are shown in U.S. Pat. No. 2,272,170, issued to A. J. Granberg, and U.S. Pat. No. 3,482,446, issued to R. L. Wrinkle et al. Meters of this type often employ a large number of sliding or rubbing surfaces which move relative to one another to form the variable volume positive displacement compartments which transfer fluid from the meter inlet to its outlet, along with gearing or similar structures to maintain these surfaces in a timed relationship. As a result, sliding surfaces along with associated bearings must be machined to extremely close tolerances to prevent excessive leakage, seals must be employed in numerous areas, also to prevent leakage, and the timing structures or gears must be carefully machined to prevent volumetric variations in the compartments. Such factors have lead to relatively costly fluid meters having abnormally high frictional drags and short service life due to the wear between the sliding surfaces which eventually causes the leakage rates to reach such levels that the errors in the meter reading may become unacceptable due to a reoccurring requirement for periodic calibration. When corrosive fluids or abrasive fluids are metered with such devices, their service life becomes extremely limited due to the large number and area of the sliding surfaces within the meter forming the variable volume positive displacement compartments.

Some of the objects of the instant invention are to provide a lower cost meter with high volumetric accuracy which eliminates a great percentage of the frictional drag found in contemporary positive displacement fluid meters that often leads to their inaccuracy.

Further, it is an object to provide a fluid meter in which the individual fluid compartments are fully contained within a rotating rotor valve to minimize leakage and to reduce to a minimum the sliding or rubbing travel between associated sliding surfaces forming each variable volume positive displacement compartment in the instant invention.

In the instant invention it is also an object to provide precise control over the volumetric capacity of the several variable volume positive displacement compartments whereby it may accurately be calibrated for proper reading between its counter and flow therethrough.

A further object is to provide a meter structure capable of employing lightweight parts having limited travel which, coupled with the resulting low frictional drive, allows the meter to be driven by the fluid passing through the meter without slippage or significant pressure drop.

While only a few of the advantages of the instant invention are recited above, it should be appreciated that additional advantages will be apparent from the description herein and from the attached drawings.

SUMMARY OF THE INVENTION

The above objects and advantages can be accomplished by an improved fluid translating device including a hollow cylindrical meter case having an inlet and an outlet, a closed hollow cylindrical rotor valve rotatably mounted within the meter case having a plurality of equally spaced ports in its outer periphery, land means in the meter case slidably engaging the outer periphery of the rotor valve to form spaced apart valve means between the inlet of the meter case and its outlet, a rotor mounted eccentrically within the rotor valve and rotatable about an axis eccentric to the rotational axis of the rotor valve and housing thereby forming an annular space between the rotor and the rotor valve of varying cross-section, vane means mounted in said rotor and projecting radially therefrom so the vane means engage the inner surfaces of the rotor valve to form a plurality of substantially fluidtight compartments with each of said fluid compartments having fluid communication with outside of the rotor valve through one of its port means, and counting means coupled to the rotor valve to register its movement as fluid passes through the inlet of the meter to its outlet by entering the several compartments when they are in communication with the inlet of the meter and egressing from he several compartments when they are in communication with the outlet of the meter causing the rotor valve movement to be directly proportional to the actual volume of fluid passing through the meter.

The fluid meter may include structures to adjust the distance between the axis of the hollow cylindrical rotor valve and the axis of rotation of the rotor whereby the volumetric capacity of the individual compartments can be adjusted to provide precise correlation between the movement of the rotor valve and the actual meter reading.

BRIEF DESCRIPTION OF THE DRAWINGS

FIG. 1 is an exploded perspective of the novel fluid meter illustrating its construction;

FIG. 2 is a transverse cross-section through the meter shown in FIG. 1;

FIG. 3 is a radial cross-section of the fluid meter along line III—III of FIG. 2;

FIG. 4 is a section of an alternate embodiment of an adjustment mechanism whereby the eccentricity of the rotor can be changed relative to the rotor valve and housing to adjust the volumetric capacity of the individual compartments within the meter; and FIG. 5 illustrates the end view of the alternate adjusting mechanism with its cover removed which is shown in FIG. 4.

DESCRIPTION OF AN EMBODIMENT

In the exploded view of FIG. 1 the principal components of the new fluid meter 10 can be seen. One main component includes the hollow meter case 11 complete with its integral base 12, counter housing 13, inlet 14 and outlet 15. Within the hollow meter case a cylindrical rotor valve 16 is mounted for rotation on roller bearings 17 and 18 (see FIG. 2) which forms another principal component of the new meter. Roller bearing 18, on which one end of the rotor valve is supported, in turn is supported on a shoulder 19 on the meter case end plate 20 which closes the open end of the hollow meter case when attached with bolts 21 to the case. The opposite end of the rotor valve is supported on roller bearing 17 and a shoulder 22 adjacent to the counter housing.

The cylindrical rotor valve 16 includes a valve end plate 23 which is attached to the open end of the rotor valve with bolts 24 in sealing relationship to form a completely closed hollow drum-shaped valve. The valve end plate supports its associated end of the rotor valve when the outer race of bearing 18 is received in its central aperture 25, as can best be seen in FIG. 2. When the rotor valve is supported within the meter case, as previously described, it should be appreciated that the rotor valve is free to rotate on roller bearings 17 and 18 supporting its opposite ends.

The rotor valve 16 has a unique construction having a plurality of circumferentially spaced, generally rectangular ports 30 disposed in its outer peripheral surface 31, at equal intervals, as can best be seen in FIGS. 1 and 2. This outer peripheral surface of the rotor valve slidingly engages an upper land 33 and a lower land 34 in the hollow meter case 11, which are approximately 180° apart, separating passages communicating with the inlet 14 from those of the outlet 15 within the meter case 11 when the rotor valve is assembled therein. The arcuate widths of lands 33 and 34 are slightly greater than the width of the rectangular ports in the rotor valve and therefore fluid cannot pass from the inlet to the outlet passages within the meter case when a port crosses over one of the respective lands. In the areas between the upper and lower lands, the meter case is enlarged slightly to form internal passages so that the outer peripheral surface 31 of the rotor valve is not in contact with the case in these two areas and will be in free communication with any fluid in the inlet 14 or outlet 15 depending upon the angular position of the rotor valve as it rotates on roller bearings 17 and 18. From the above description, it should be appreciated that fluid entering the inlet of the meter case 11 must pass into the rotor valve via one of the several ports 30 and egress through these respective ports to the outlet 15 as the valve rotates, as hereinafter will be described. In FIG. 2, it can be seen that the circular edge surfaces of rotor valve outboard of the ports 30 slidingly engage the lands 34 and 33 at points A and B and D and C, respectively, thereby preventing any leakage across the lands as it rotates.

To prevent the free flow of fluid through the meter inlet 14, ports 30 of the rotor valve 16 and out the outlet 15 of the meter, the rotor valve includes internal structures to form multiple variable displacement compartments so that a measured amount of fluid will be transferred from the inlet to the outlet as the rotor valve turns. The structures forming the variable volume, positive displacement compartments within the rotor valve, include a rotor 40 which is received in a close-fitting sealing relationship between the inside end surface 41 of the rotor valve and the inside face 42 of the valve end plate 23, as can be seen in FIG. 2. Since the rotor is supported for rotation on a shaft 43 which projects through the aperture 25 of the rotor valve end plate that is oriented so the rotational axis of the rotor valve, an annular space of varying cross-section is formed between the outer cylindrical periphery of the rotor and the inner cylindrical periphery of the rotor valve. The rotor includes a driving pin 44, projecting axially from its face which engages the inner end surface of the rotor valve, and which in turn is received in an elongated slot 45 in this end of the rotor valve. Through this arrangement, the rotor is coupled with the rotor valve for simultaneous rotation even though their axes of rotation are eccentric to one another. The elongated slot will allow the pin to reciprocate radially with reference to the rotor valve as these two members rotate in unison.

The annular space between the outer surface of the rotor and the inner cylindrical surface of the rotor valve is divided into a plurality of independent compartments 50, each compartment having communication to the outer surface of the rotor valve through an associated rectangular port 30, by a plurality of vane members 51 which project radially from the rotor 40 to engage the inner cylindrical surface of the rotor valve. This arrangement due to the engagement of the vanes with the several surfaces divides the annular space into multiple fluid tight compartments. The edges 51a of the vanes engage the inner end surface 41 of the rotor valve and the inner face 42 of the valve end plate 23, thereby ensuring full sealing engagement between the several components. The vane members are received in radial grooves 52 formed in the rotor, as can be seen in FIGS. 1, 2, and 3, and are urged outwardly against the inner cylindrical surface of the vane by a ring 53 which is received in an annular groove 54 formed in one end of the rotor so that the ring can be inserted into the central portion of the rotor to simultaneously engage the inboard ends 51b of all the vanes, as can be seen in FIG. 3. This ring should have some resilience, but it should be appreciated that as one vane moves in or out in a reciprocal manner in its associated groove 52, a vane which is diametrically opposite thereto will move in the opposite direction. As a result, very little deformation of the ring occurs and it can be employed to slightly spring-load all the several vanes outwardly against the inner cylindrical surface of the rotor valve.

With the rotor 40 assembled within the rotor valve with vanes 51, it can be appreciated that the plurality of compartments formed within the drum thereafter will provide multiple independent variable displacement chambers 50 through which the fluid from the inlet must pass to get to the outlet. Because the rotor is keyed to the rotor valve with pin 44 so the two rotate in unison, the sliding movement of vanes 51 against their contiguous surfaces is very limited. The actual movement of the outboard ends of the vanes is a reciprocal sliding movement on the inner surface of the rotor valve during each revolution of the latter with the distance being equal to the eccentric offset between the rotor and the rotor valve and its housing. Thus, the vanes do not "sweep" the entire cooperating surface like conventional meters thereby providing the current invention with some of its outstanding features, such as long service life, minimum frictional drag, low pressure drop, ease of construction, etc.

It should be appreciated that most of the movement of the individual vanes 51 relative to their associated components occurs as they slide reciprocally in grooves 52 of rotor 40. Further, it should be noted that most of the components are formed of cylindrical surfaces or parts having straight edges which are easy to machine which reduces their cost of manufacture. However, if it is desired, the outboard ends of vanes 51 contacting the inner cylindrical surface of the rotor valve 16 can be machined in an arcuate contour to match this surface. The edges of the vanes may include sealing means such as elastomer strips (not shown) in grooves in their edges. For example, tetropolyfloroethylene strips may be used.

As can be seen in FIG. 2, the rotor shaft 43 is supported by an attached smaller stub shaft 43a which has its axis eccentric to the axis of the rotor shaft (the eccentricity of these respective axes in the drawings is exaggerated for purposes of illustration). The stub shaft, in turn, is received in a closely fitting bore 60 in the meter case end plate 23 so that its threaded end 61 projects axially from the outer surface of this plate. A nut 62 is employed to lock the stub shaft in the bore after wrench has been employed on flats 63 at the outermost end of the stub shaft to set the meter displacement during calibration. Turning the stub shaft varies the distance between axis of rotation of rotor 40 and the axis of rotor valve 16, the latter of which is fixed on bearings 17 and 18. These axes are parallel to one another and a change in their distance of separation will change the displacement of the meter during calibration.

Actually, it requires a minor change between the locus of these two respective axes to accurately calibrate the meter. On a purely theoretical basis, the movement of the rotor shaft 43 should be linearly toward the rotational axis of the rotator valve 16 along a line bisecting the upper and lower lands 33 and 34 to prevent pressure build-up or drop as ports 30 cross these lands. Obviously, in extremely precise meters this preferred movement can be accomplished by using a linear adjusting device in place of the arcuate movement obtained through the employment of the eccentric stub shaft arrangement described above.

In FIGS. 4 and 5, a modified embodiment of the calibrating mechanisms previously described is illustrated wherein the rotor shaft 43 is carried in a separate assembly which mounts on a meter case end plate 20 (not shown) having a central aperture for mounting this assembly. While this assembly is very similar in operation to the arrangement shown in FIG. 2, it includes an index plate 71 which is keyed to the stub shaft 43a and which has indices thereon that cooperate with a pointer 72 to provide an indication of the adjustment during calibration. Employing this assembly, locking screw 73 may be loosened to release the index plate, and, if the nut 62 is released, the index plate may be appropriately adjusted with a screwdriver for calibrating the meter depending upon whether the displacement is to be increased or decreased. Subsequent to this adjustment, the locking screw can be tightened along with nut 62 and the assembly cover plate 74 replaced with screws 75. A conventional meter seal may be employed with cover plate to prevent tampering with the meter once it is calibrated.

In the inboard end of the rotor valve 16 and countersunk in hub 22 is a gear shaft 80 having a bevel gear 81 at its outboard end which provides the drive output from the rotor valve for counter 82 mounted in the counter housing 13. The counter can be a conventional odometer and has its drive shaft 83 driven by bevel gear 84 which meshes with bevel gear 81. The drive shaft is supported in a collar 85 received in bore 86 in a counter housing and the collar includes two O-rings 87 fitted in grooves in the collar to prevent leakage from the meter case through the counter housing. The collar is retained in the housing with screw 88 which engages the collar between the several O-rings. Thus, the rotational movement of the valve is registered in window 89 of the odometer in a conventional manner.

Since the novel meter is designed to run full of fluid, that is, all compartments of the meter are filled with fluid prior to operation to minimize error, it is desirable to provide enlarging grooves 52a at the bottom of the grooves 52 of rotor 40 in which the vanes are received to prevent pressure build-up by the pumping action as the vanes reciprocate in the rotor during rotation of the rotor valve. These small grooves allow any fluid at the base of the several vanes to vent to the central cavity 54 wherein the ring 53 is located. Also, it is to be remembered that as one vane moves inwardly another vane is moving outwardly by the same amount so that there is no net change of fluid volume within the interior of the rotor. Similarly, the counter housing 13 below the O-rings 87 can be filled with fluid and during rotation of the vane no net change in fluid volume occurs in this area thereby eliminating any flow or meter error. As a result, the instant meter can deliver an accurate measured volume of fluid from the inlet of the meter to the outlet of the meter as each compartment 50 passes through the inlet passage and then through the outlet passages during which travel each compartment increases in volume and then decreases in volume, respectively.

The meter according to this invention is didirectional and the inlet and outlet may be switched without incident. If the meter registering device is reversible, flow in one direction can be registered positively while flow in the other direction will be subtracted from the reading.

The fluid passing through the meter enters the compartments 50 and, assuming a slight pressure head on the inlet, will cause a reaction between the inner cylindrical surface of the rotor valve 16, the vanes 50, and the outer surface of the rotor driving the rotor valve so fluid will be transferred from the inlet to the outlet due to the eccentric mounting of the rotor in the meter housing and rotor vane.

It should be appreciated that the outer cylindrical surface of the rotor valve in cooperation with the upper and lower lands form two very unique valves between the meter inlet and outlet which prevent leakage therebetween. While for purposes of description the term "rotor valve" has been employed, it should be understood that "valve drum" or "rotor drum" would also be aptly descriptive of this structural combination.

A new "closed turbine" structure is provided by the new meter structure which might appropriately be referred to as a positive displacement turbine. As a result of this structure, the velocity of the fluid entering the inlet and leaving the outlet creates a "turbine driving effect" causing the rotor valve to turn. However, since the fluid must pass through positive displacement compartments 50, there can be no "fluid slippage" ensuring unerring accuracy in this meter.

What is claimed is:

1. An improved positive displacement fluid translating device comprising:
    a hollow case having an inlet an outlet, and a cylindrical cavity communicating with said inlet, and outlet;
    a hollow rotor valve rotatably mounted in said cylindrical cavity, said rotor valve having a plurality of ports in its outer cylindrical surface;
    land means within said meter case slidingly engaging said outer cylindrical surface of said rotor valve at spaced locations to form spaced-apart valve means preventing fluid flow from said inlet to said outlet except through said ports in said rotor valve;
    a cylindrical rotor rotatably mounted on a shaft within said rotor valve with its rotational axis parallel and eccentric to the rotation axis of said rotor valve thereby forming an annular chamber therebetween;
    connecting means coupling said rotor valve and said cylindrical rotor so they rotate simultaneously;
    a plurality of vane members having inner and outer ends reciprocally mounted in said rotor in radial grooves, said vane members extending from said rotor so their outer ends engage the inner cylindrical surface of the rotor valve dividing said annular chamber into a plurality of positive displacement fluid compartments which change in volume as said rotor valve and said rotor rotate; and
    floating means commonly engaging the inner ends of said plurality of vane members to keep their outer ends against said inner cylindrical surface of said rotor valve.

2. The improved fluid device as defined in claim 1 wherein the connecting means includes a slidable key means between the rotor valve and the cylindrical rotor coupling them for simultaneous rotation about their respective axes.

3. The improved fluid device as defined in claim 2 wherein gear means are attached to rotor valve and to a meter registering device to record rotational movement of said rotor valve which is directly proportional to the volume of fluid passing from the inlet to the outlet.

4. The improved fluid device as defined in claim 2 wherein the floating means includes spring means on the inner ends of the vane members to urge them radially outwardly against the inner cylindrical surface of the rotor valve.

5. The improved fluid device as defined in claim 4 wherein the spring means is a ring means and the rotor includes a blind annular groove in its central portion to receive said ring means.

6. The improved fluid device as defined in claim 2 wherein the ports in the outer cylindrical surface of the rotor valve are equally spaced circumferentially about its outer cylindrical surface.

7. The improved fluid device as defined in claim 2 wherein the land means are located approximately 180° apart and are of a width that fully closes each port as said ports slidingly cross said lands during rotation of the rotor valve thereby closing the associated variable displacement chamber associated with such port as crosses land to prevent flow from the inlet to the outlet.

8. The improved fluid device as defined in claim 7 wherein passage means are provided within the case between the spaced-apart land means whereby the outer cylindrical surface of the rotor valve inclusive of its ports will be in free fluid communication alternately with the inlet or the outlet except for those portions of said rotor valve sliding engaging said land means.

9. The improved fluid device as defined in claim 2 wherein the shaft on which the rotor is rotatably mounted includes adjusting means whereby the degree of eccentricity between the rotational axis of said rotor and said rotor valve mounted within the meter case can be varied to change the displacement of the plurality of positive displacement fluid compartments for calibrating the device.

10. The improved fluid device as defined in claim 9 wherein the adjusting means includes a stub shaft eccentrically attached to the shaft on which the rotor is rotatably mounted, said stub shaft supporting said shaft from the meter case through a fitted bore whereby adjusting rotation of said stub shaft will vary the eccentricity between said rotor and the rotor valve.

11. An improved fluid meter having a registering unit form measuring flow therethrough comprising:
    a hollow meter case having an inlet, an outlet, and an end plate closing its open end; 1
    a closed, hollow rotor valve rotatably mounted in said meter case, said rotor valve having a plurality of equally spaced ports in its outer cylindrical surface;
    gear means connecting said rotor valve with the registering unit;
    drive means connecting said rotor valve and the registering device whereby rotational movement of the former is recorded by the latter; 1
    a pair of land means slidingly engaging said outer cylindrical surface of said rotor valve at spaced locations within said case to form valves closing said ports as they cross said lands;
    passage means between said land means communicating with said ports in said rotor valve, one of the passage means in communication with said inlet and the other in communication with said outlet;
    a rotor rotatably mounted within said closed hollow rotor valve on a shaft with its rotational axis parallel and eccentric to the rotational axis of said rotor valve whereby an annular space of varying cross section is formed between the outer surface of said rotor and the inner cylindrical surface of said rotor valve, said rotor having a plurality of radial slots parallel to its rotational axis;
    connecting means coupling said rotor valve and said cylindrical rotor so they rotate simultaneously; 1 a plurality of vane members having inner and outer ends reciprocally mounted in said radial slots of said rotor and extending from said outer surface of the rotor so their outer ends engage the inner cylindrical surface of said rotor valve thereby dividing said annular space therebetween into a plurality of substantially fluid tight compartments with each compartment having one of said ports cooperating therewith whereby an accurate measured volume of fluid can be transferred from said meter inlet to its outlet as rotation of said rotor valve and rotor causes said compartment to increase in volume when in communication with the inlet and decrease in volume when in communication with the outlet; and floating means commonly engaging said inner ends of said plurality of vane members to keep their outer ends against said inner cylindrical surface of said rotor valve.

12. The improved fluid meter as defined in claim 11 wherein the connecting means includes slidable key means between the rotor valve and the rotor whereby timed simultaneous rotational movement about their respective eccentric axes will occur to maintain registration between each compartment and its associated port.

13. The improved fluid meter as defined in claim 11 wherein the vane members are biased against the inner cylindrical surface of the rotor valve the floating means acting on their inner ends.

14. The improved fluid meter as defined in claim 11 wherein the shaft on which the rotor is rotatable supported within the rotor valve is supported from the meter case and includes adjusting means whereby the eccentricity of the rotational axes of said rotor and said rotor valve can be varied to change the volumetric capacities of the plurality of compartment with said rotor valve.

15. A positive displacement meter having a flow registering device comprising a meter case with a closed cylinder valve mounted therein for rotation and connected to drive said registering device, said cylinder valve having a plurality of compartments therein formed by a vaned rotor disposed for rotation therewithin on an axis eccentric to the axis of rotation of said cylinder valve, said vaned rotor having a floating ring commonly engaging the inner ends of the vanes in the rotor to maintain them in timed relationship and said cylinder valve also having a plurality of ports circumferentially disposed in said cylinder valve, one of said ports cooperating with each of said compartments, a pair of land means slidingly engaging said cylinder valve at spaced locations forming two separated passage means on opposite sides of said land means, each of which is in communication with a cylindrical sector of said cylinder valve and its ports, an inlet connected to one of said separated passage means and an outlet connected to the other of separated passage means whereby fluid entering said inlet passes through said compartments in said cylinder valve when passing to said outlet driving the cylinder valve proportional to fluid flow through the meter.

* * * * *